United States Patent [19]

Stiles et al.

[11] 4,271,397

[45] Jun. 2, 1981

[54] NONRECIPROCAL PHASE SHIFTER FOR A RING LASER GYRO

[75] Inventors: John C. Stiles, Morris Plains, N.J.; Hubert F. Elbert, Tucson, Ariz.

[73] Assignee: The Singer Company, Little Falls, N.J.

[21] Appl. No.: 65,388

[22] Filed: Aug. 9, 1979

[51] Int. Cl.³ .............................................. H01S 3/10
[52] U.S. Cl. .............................. 331/94.5 C; 356/350; 331/94.5 T
[58] Field of Search ..................... 356/350; 331/94.5 C

[56] References Cited

U.S. PATENT DOCUMENTS

| | | | |
|---|---|---|---|
| 3,373,650 | 3/1968 | Killpatrick | 356/350 |
| 3,462,708 | 8/1969 | McClure | 356/350 |
| 3,508,831 | 4/1970 | Macek | 356/350 |
| 3,826,575 | 7/1974 | Walter, Jr. | 356/350 |
| 3,867,034 | 2/1975 | Aronowitz | 356/350 |

Primary Examiner—William L. Sikes
Assistant Examiner—Leon Scott, Jr.
Attorney, Agent, or Firm—John C. Altmiller; Thomas W. Kennedy

[57] ABSTRACT

In a ring laser gyroscope having a triangular optical resonator with mirrors at its corners, in order to prevent lock-in, a portion of the light from the beams that passes through the mirrors at the corners is fed back into the clockwise and counter-clockwise beams after being passed through an optical resonator containing a nonreciprocal phase shifter.

12 Claims, 4 Drawing Figures

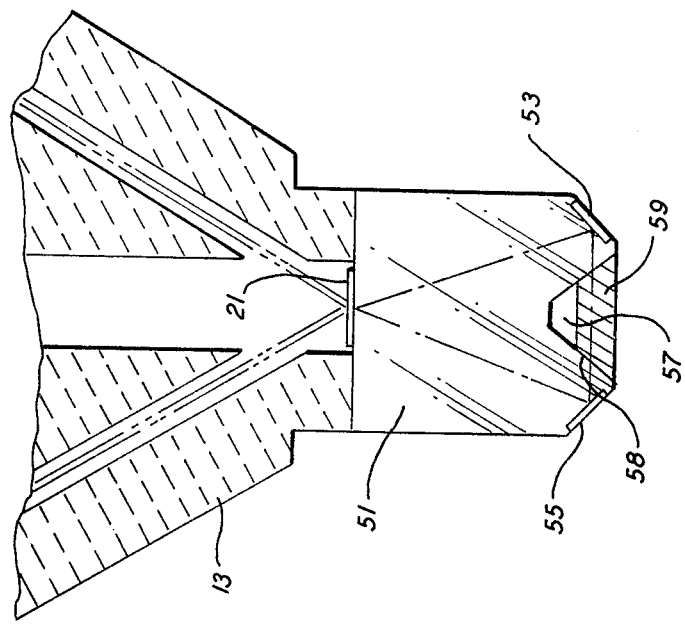
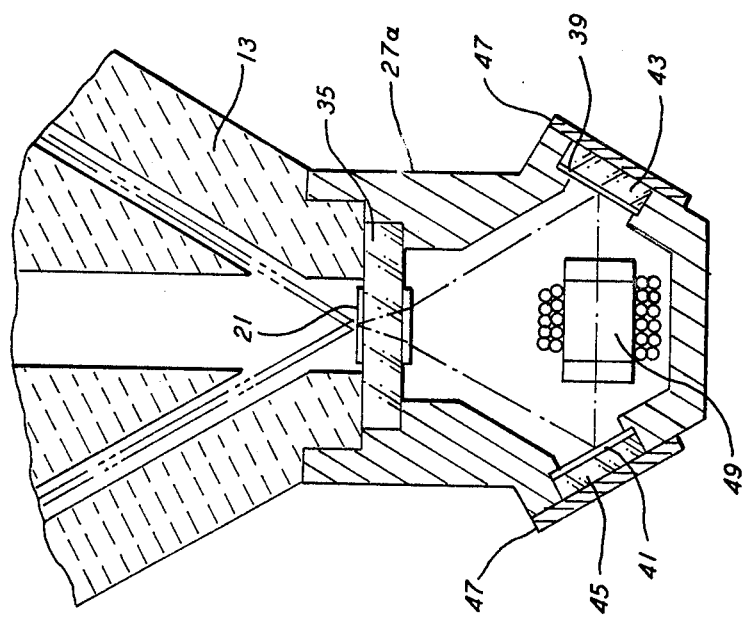

NONRECIPROCAL PHASE SHIFTER FOR A RING LASER GYRO

BACKGROUND OF THE INVENTION

This invention relates to ring laser gyroscopes in general and more particularly to a method and apparatus for preventing lock-in in a ring laser gyroscope.

A typical ring laser gyroscope is disclosed in U.S. Pat. No. 3,373,650, to J. E. Kilpatrick. Such a ring laser gyroscope consists of a triangular optical resonator capable of supporting a clockwise and a counterclockwise beam nominally of the same frequency. When such a device is rotated, the frequency in one beam increases while the other decreases. When the beams are combined the frequency shifts to produce a beat note frequency proportional to the input angular velocity which can then be detected, and likewise is a measure of angular rate.

However, at low input rates, light scattered from the mirrors in the triangular optical resonator tends to couple the two beams together so that the beat note, and hence the output is suppressed. This effect is known as lock-in. To overcome this problem various methods of biasing the ring laser gyroscope to avoid lock-in have been proposed A number of these methods include a mechanical biasing in which the ring laser gyroscope is physically rotated at a controlled rate so as to prevent lock-in. Other methods of biasing utilize phase shifting of the beams. For example, such phase shifting can be done with different types of nonreciprocal phase shifters such as a Faraday cell or a Pockels cell. The aforementioned U.S. patent to Kilpatrick creates a bias by the means of a Faraday cell.

Another solution to this problem utilizing two separate cavity resonances is described in U.S. Pat. No. 3,879,130. This patent, in its background portion includes a detailed description of the various prior art methods used in overcoming a lock-in problem. In U.S. Pat. No. 3,627,422, biasing is taught using an acoustic generator, light shutter or electro-optical crystal. The aforementioned Pockels cell is a device of this type. Another device utilizing the Faraday effect is disclosed in U.S. Pat. No. 3,392,622. A device which utilizes the Zeeman frequency offset effect for biasing is disclosed in U.S. Pat. No. 3,382,759.

A common characteristic of these devices using non-reciprocal phase shifters for biasing the laser is that the phase shifting is carried out in the main optical path. Only a very small phase shift is required. For example, a phase shift of 5 arc seconds between the two beams will cause a 10,000°/ hour bias using typical ring laser gyro parameters. The problem with the conventional phase shifters such as the aforementioned Faraday cells is their extreme sensitivity to environmental effect such as temperature gradients and stray magnetic fields. These effects can readily cause unpredictable phase shifts of a fraction of a second of arc which results in an unacceptably large bias variation. Thus, there is a need for an improved manner of carrying out a non-reciprocal phase shift to bias a ring a laser gyroscope to avoid lock-in which does not suffer from these disadvantages, i.e., which is not particularly sensitive to environmental effects.

SUMMARY OF THE INVENTION

The present invention solves this problem by feeding back into the counterclockwise and clockwise beams a portion of the light from the beams that pass through the mirrors at the corners of the triangular optical resonator, after passing this light through an optical resonator containing a nonreciprocal phase shifter. This is done in such a manner so as to produce a large phase shift in a very small proportion of light. Typically, the mirrors used in the corners of a typical ring laser gyroscope such as that of the aforementioned patents, pass approximately 0.03% of the incident light. At one of the mirrors, some of this light is used to measure the output. The light of the other mirrors is not used at all and is lost. In accordance with the present invention, a secondary triangle which captures the leakage light from one of the mirrors and ultimately causes up to $\frac{1}{3}$ of it to be directed back into the main triangle is utilized. Thus, approximately 0.01% of the light in the main triangle circulates through the smaller triangle and then rejoins the main triangle travelling in the same direction. Such is true for both the clockwise and counterclockwise beams of the symmetry of the arrangement.

The secondary triangle contains a nonreciprocal phase shifter which makes use of conventional electro-optical or magneto-optical effects, such as the Faraday effect, the Kerr effect, the Pockels effect or the Fizeau effect, to shift the phase of the counterclockwise beam with respect to the clockwise beam. This is what is meant by a nonreciprocal phase shifter. In other words it shifts the phase of one beam in one direction and the phase of the other beam in the other direction. The phase shifted beams rejoin the main traingle beams and mix with them. The overall phase shift is given by the product of the phase shift in the secondary triangle with the ratio of the feedback light to primary light. For example, if the light in the secondary triangle is shifted in phase by one radian and if one part in 40,000 of the light is fed back, the main beam will be phase shifted by 5 seconds of arc, producing a bias shift of 10,000° per hour which is sufficient to overcome lock-in.

The advantage of the present invention is that very large phase shifts can be employed in the secondary triangle. Thus, unwanted phase shifts produced by environmental effects are small in comparison. In other words, using the above example, the effect of any unwanted phase shift will be reduced by a factor of 40,000 over what they would be if the phase shifter were placed in the main beam.

Another advantage of the present invention is that it brings about a corresponding reduction in scattering effects. An optical element placed in the main beam will generally scatter some of the clockwise beam into the counter-clockwise beam causing increased lock-in. This is also true of the light in the secondary triangle. However, since it is only one part in 40,000 of the light, scattered light is reduced proportionally.

DESCRIPTION OF THE DRAWINGS

FIG. 3 is a similar view of a second embodiment of phase shift according to the present invention.

FIG. 4 is a further embodiment of a phase shifter according to the present invention.

DETAILED DESCRIPTION

Figure 1:
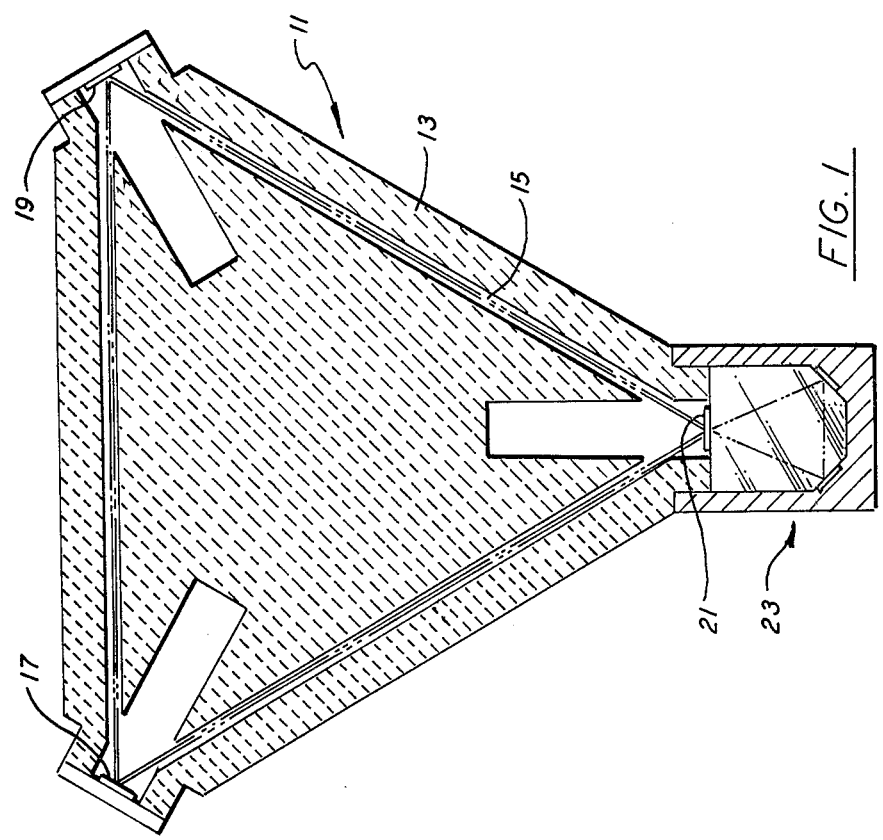
FIG. 1 is a view, partially in cross-section of a ring laser gyroscope having installed therein the phase shifter of the present invention.

FIG. 1 illustrates a typical ring laser gyro with the present invention is utilized. Such a ring laser gyroscope is described in detail in copending Ser. No. 831,114, now U.S. Pat. No. 4,190,364, issued Feb. 26, 1980, assigned to the same assignee as the present invention, which is hereby incorporated by reference. Basically, the ring laser gyroscope includes a triangular block 13 made of a helium diffusion resistant glass ceramic of low thermal expansion. Formed within the block is a triangular cavity 15, the corners of which are defined, respectively by mirrors 17, 19 and 21. Mirror 19 or 17, for example, can comprise an ouptput mirror of the type described in the aforementioned application Ser. No. 831,114, now U.S. Pat. No. 4,190,364, issued Feb. 26, 1980. Two monochromatic light beams are directed, by the mirrors, around the cavity 15 in block 13. As noted above, these beams are nominally of the same frequency and as the device 11 rotates about axis A a beat frequency is developed at the output mirror which can be detected. As also noted above, a problem exists with a low input rate, i.e., when the device 11 is not rotating or rotating slowly, in that the two beams lock together and no output is obtained. It is the device 23 of the present invention which is utilized to bias the ring laser gyroscope 11 to solve this problem.

At each of the mirrors 17, 19 and 21, a small amount of the light, for example 0.03%, passes through the mirror, the remainder of the light being reflected. At the output mirror, this light is detected and used to generate the output. At the other two mirrors, in prior art ring laser gyroscopes, it was lost. However, in accordance with the present invention, a secondary triangle is established in phase shifter 23 to circulate this light therein and to direct it back into the main beam. Included within the phase shifter 23 are means to cause a nonreciprocal phase shift of the two beams, i.e., the clockwise and counterclockwise beams, to prevent lock-in.

Figure 2:
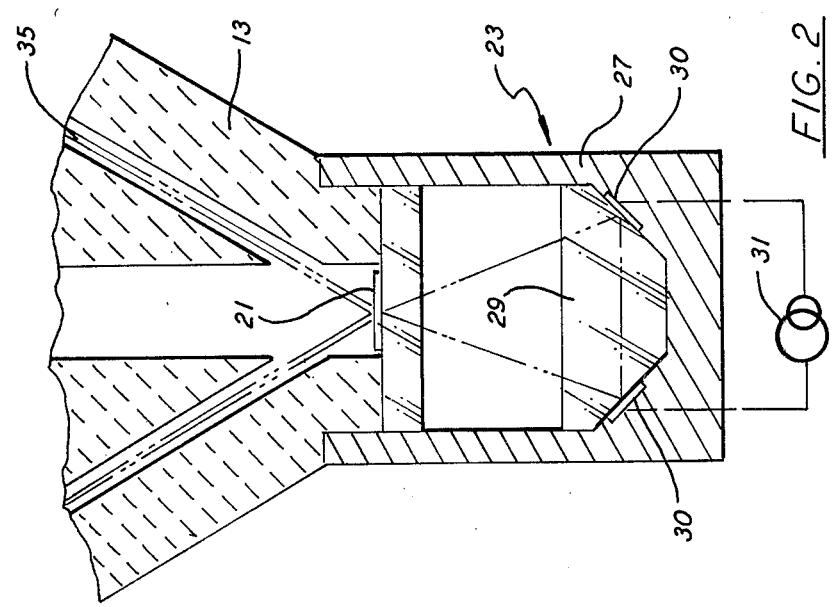
FIG. 2 is an enlarged view of a first embodiment of the phase shifter of the present invention .

A first embodiment of the present invention is shown in more detail on FIG. 2. The phase shifter 23 includes an outer casing 27 within which there is disposed a quartz crystal 29. At two corners of the quartz crystal multilayer coatings 30 are deposited. Applied across the coatings, which are of a conductive nature, is an electrical potential supplied by a generating means 31. Crystal 29 employs total internal reflection which is enhanced by the multiple layered dielectric film 30 deposited on the two outboard corners. Voltage applied across the two films 30 establishes an electric field through the crystal which causes a nonreciprocal phase shift in the beams passing therethrough. The beam in the direction of the electric field is advanced in phase, while the beam going in the opposite direction has its phase retarded. This is known as the Pockels effect. Approximately ⅓ of the light which passes through the mirror 21 is fed back into the main beams 35 with a phase shift, which, when mixed with the main beams results in a bias between the clockwise and counterclockwise beams. As noted above, for example, with a 40,000:1 ratio a phase shift which is sufficient to avoid lock-in will be obtained. The generator 31 is shown as an AC source since it is desired that the direction of theelectric field be reversed periodically. The housing 27 is sealed to the block 13 to prevent any leakage.

FIG. 3 illustrates a second embodiment of the present invention. Once again, a housing, 27a, is attached to the block 13 at the corner. Shown is the mirror 21 which is disposed on a substrate 35 of a material transparent to the radiation. This, along with the housing, aids in sealing. Disposed on the other side of substrate 35 is an anti-reflective coating 37. Once again, a secondary triangular resonator is formed between the mirror 21 and additional mirrors 39 and 41, disposed respectively on substrates 43 and 45. The mirrors and substrates are contained in suitable recesses in the housing 27a with covers applied over the housing to hold the mirrors in place. Disposed between the two mirrors and the light path therebetween is a Faraday cell 49 of the type described in the aforementioned patents. As described therein, it causes a nonreciprocal phase shift in the two beams.

A third embodiment of the present invention is illustrated by FIG. 4. In this embodiment the mirror 21 is mounted to a clear block 51 which has mirrors 53 and 55 formed at its corners by reflecting films. The block contains a cutout 57 into which is inserted a reciprocal phase shifter 59 working either on a Pockels effect or a Faraday effect. The sides 58 of the cavity 57 are cut at the Brewsters angle of reflection which has the property of passing plane polarized light without reflection thus avoiding the need for anti-relective coatings.

What is claimed is:

1. A nonreciprocal phase shifting apparatus for a ring laser gyro, said gyro including a block having a ring resonator cavity having at least three corners, and including primary and secondary and tertiary reflecting corner mirrors disposed respectively in said three corners, said primary mirror being adapted to pass therethrough a part of each of said beams, said primary and secondary and tertiary mirrors having planes arranged to support a main clockwise beam and a main counter clockwise beam in said cavity, said phase shifting apparatus comprising:
   (a) an optical resonator directing the part of each of the beams passing through said primary mirror in a closed path, directing a portion thereof back through the primary mirror into its respective main beam; and
   (b) a nonreciprocal phase shifter inserted in said closed path; and wherein said optical resonator comprises a substrate for supporting said primary mirror; first and second planar mirrors, the planes thereof intersecting said plane of said primary mirror with equal internal angles, said angle being such that a part of the respective beam passing through said primary mirror will strike one of said first and second mirrors, be reflected to the other and from the other back through said primary mirror and into said respective main beam.

2. The apparatus according to claim 1 wherein said first and second mirrors are formed by a Pockels crystal cut with said angles to provide totally internally reflective surfaces and further including multilayer conductive coatings on said reflective surfaces and means for impressing a voltage across the multilayer surfaces whereby said crystal will act as a nonreciprocal phase shifter.

3. Apparatus according to claim 2 and further including a housing surrounding said substrate and crystal.

4. Apparatus according to claim 3 wherein said nonreciprocal phase shifter comprises a Faraday cell placed between said first and second mirrors.

5. Apparatus according to claim 1 wherein said nonreciprocal phase shifter comprises a Pockels cell placed between said two mirrors.

6. Apparatus according to claim 1 wherein said substrate comprises an optically clear block, said block having cut therein surfaces to form said first and second mirrors as totally internally relective surfaces, said block containing a cut-out between said two mirrors and wherein said nonreciprocal phase shifter is inserted in said cutout.

7. The apparatus according to claim 6 wherein said nonreciprocal phase shifter comprises a Faraday cell.

8. The apparatus according to claim 6 wherein said nonreciprocal phase shifter comprises a Pockels cell.

9. Apparatus according to claim 6 wherein the surfaces of said cut-out intersected by the part beams are cut at the Brewsters angle.

10. Apparatus according to claim 6 wherein said mirrors further comprise a reflective coating on the outside of said block.

11. In a ring laser gyro including a block having a resonant cavity with at least three corners, and including primary and secondary and tertiary reflecting corner mirrors disposed respectively in said three corners and being arranged to support clockwise and counterclockwise resonating main beams, said primary mirror being adapted to pass therethrough a part of each said beam to form a respective part beam, a method of preventing lock-in comprising:
 (a) directing the parts of the beams passing through said primary mirror through an optical resonator and back into the main beams through said primary mirror; and
 (b) causing a nonreciprocal phase shift of the part beams in said optical resonator, wherein about 0.03% of each of the main beams passes through said primary mirror and one-third of that amount passes back into said one of the main beams and wherein each said part beam is phase shifted on the order of one radian.

12. The method of claim 11 wherein said step of causing comprises inserting a nonreciprocal phase shifter into the beam path in said optical resonator.

* * * * *